(12) United States Patent
Harrison et al.

(10) Patent No.: US 6,286,220 B1
(45) Date of Patent: Sep. 11, 2001

(54) REFLECTIVE COMPASS DEVICE

(75) Inventors: Robert Harrison, Poway, CA (US); Manu C. Patel, Huntsville, AL (US)

(73) Assignee: Directional Robotics, Inc., Huntsville, AL (US)

( * ) Notice: Subject to any disclaimer, the term of this patent is extended or adjusted under 35 U.S.C. 154(b) by 0 days.

(21) Appl. No.: 09/451,525

(22) Filed: Nov. 30, 1999

(51) Int. Cl.[7] .................................................. G01C 17/26
(52) U.S. Cl. .................................. 33/355 R; 33/1 PT
(58) Field of Search .................................. 33/1 N, 1 PT, 33/355 R, 356, 360

(56) References Cited

U.S. PATENT DOCUMENTS

| | | | |
|---|---|---|---|
| 2,325,365 | * | 7/1943 | Britten, Jr. ............................. 33/360 |
| 2,600,644 | * | 6/1952 | Hand ................................... 33/355 R |
| 3,786,571 | | 1/1974 | Kelman . |
| 4,027,398 | | 6/1977 | Fowler et al. . |
| 4,341,023 | | 7/1982 | Marcus et al. . |
| 4,414,754 | | 11/1983 | Lapeyre . |
| 4,640,016 | * | 2/1987 | Tanner et al. .......................... 33/356 |
| 4,922,620 | * | 5/1990 | Terragni ................................. 33/1 N |
| 5,042,157 | | 8/1991 | Garrett et al. . |
| 5,301,434 | * | 4/1994 | Imaizumi .............................. 33/1 PT |
| 5,448,835 | | 9/1995 | Lewis . |
| 5,469,630 | * | 11/1995 | Lewis ..................................... 33/360 |
| 5,749,150 | * | 5/1998 | McDermott ......................... 33/355 R |
| 5,752,322 | | 5/1998 | Lewis . |
| 6,145,209 | * | 11/2000 | Chang ................................. 33/355 R |
| 6,212,783 | * | 4/2001 | Ott et al. ............................... 33/1 PT |

* cited by examiner

*Primary Examiner*—G. Bradley Bennett
(74) *Attorney, Agent, or Firm*—Waddey & Patterson, PC; Harold W. Hilton; John C. Garvin, Jr.

(57) ABSTRACT

A light-reflective device for determining positional information relative to an external magnetic field having a housing, a light-reflective compass assembly, a light generating and detecting assembly, a processor, and a display. The light-reflective compass assembly further includes a balanced disk magnet mounted on a compass card. The compass card includes a reflective pattern representative of the position of the housing with respect to the external magnetic field. The reflective compass assembly reflects light generated by the light generating and detecting assembly back toward the light generating and detecting assembly. The light generating and detecting assembly generates a signal representative of the position of the housing relative to the external magnetic field. The processor processes the signal received from the light generating and detecting assembly to determine the position of the housing relative to the external magnetic field and outputs the position to the display.

16 Claims, 10 Drawing Sheets

FIG. 11  PIXEL NUMBER (300 PIXELS PER INCH)

FIG. 12

REFLECTIVE COMPASS DEVICE

BACKGROUND OF THE INVENTION

The present invention relates generally to a device for determining directional information relative to an external magnetic field. More particularly, this invention pertains to a light-reflective device for determining directional information relative to an external magnetic field.

There are no known light-reflective devices available that can be used to determine directional information relative to an external magnetic field. While there are some existing patents relating to light-transmission devices operable for determining directional information relative to an external magnetic field, none of these patents address the problems solved by the present invention. In addition, none of these patents discloses the concept of using a light-reflective device to determine directional information.

U.S. Pat. No. 4,414,754, issued to Lapeyre on Nov. 15, 1983 and entitled "High Resolution Compass Card Position Decoder," discloses a light-transmission device for determining directional information relative to an external magnetic field. The '754 device includes a disk having a light-transmission pattern, a light source on one side of the disk, and an array of light detectors on the other side of the disk. The '754 device does not disclose the use of a disk having a light-reflective pattern.

Another patent, U.S. Pat. No. 5,448,835, issued to Lewis on Sep. 12, 1995 and entitled "Compass device," discloses a light transmission device for determining directional information relative to an external magnetic field. The '835 device includes a light source, a variable-width, slotted compass card for transmitting light, a magnet, and two light detecting devices. The '835 device also does not disclose the use of light-reflective disk. The size of the magnet used in the '835 device is limited by the light-transmission compass card. Smaller magnets limit the torque available to rotate the compass card, reduce the response time of the device, and adversely affect the balance of the device. The '835 device is also sensitive to the intensity of light striking the compass card. Variations in the intensity of light passing through the compass card may generate errors in the directional information.

What is needed, then, is a device that is insensitive to variations in the intensity of light striking the compass card and includes a larger, more balanced magnet.

SUMMARY OF THE INVENTION

The present invention accomplishes these and other objectives with a light-reflective device for determining positional information relative to an external magnetic field including a housing, reflective compass assembly, light generating and detecting assembly, a processor, and a display.

One object of the present invention is to provide a light-reflective device that is insensitive to the intensity of light striking a compass card.

Another object is to provide a light-reflective device including a balanced disk magnet.

Still another object is to provide a light-reflective device including a magnet having a length equal to the diameter of a compass card.

Another object is to provide a light-reflective device including a reflective pattern representative of directional information relative to an external magnetic field.

A further object of the present invention is to provide a light-reflective device including a contact image sensor module as the light generating and detecting assembly.

Still another object is to provide a compass card having a reflective pattern including a non-reflective spiral line and a non-reflective circle.

Yet another object is to provide such a reflective pattern having a non-reflective spiral line, a first non-reflective circle, and a second non-reflective circle.

The above and other objects, features, and advantages of the present invention should become even more readily apparent to those skilled in the art upon a reading of the following detailed description in conjunction with the drawings wherein there is shown and described illustrated embodiments of the invention.

DESCRIPTION OF THE PREFERRED EMBODIMENTS

Figure 1:
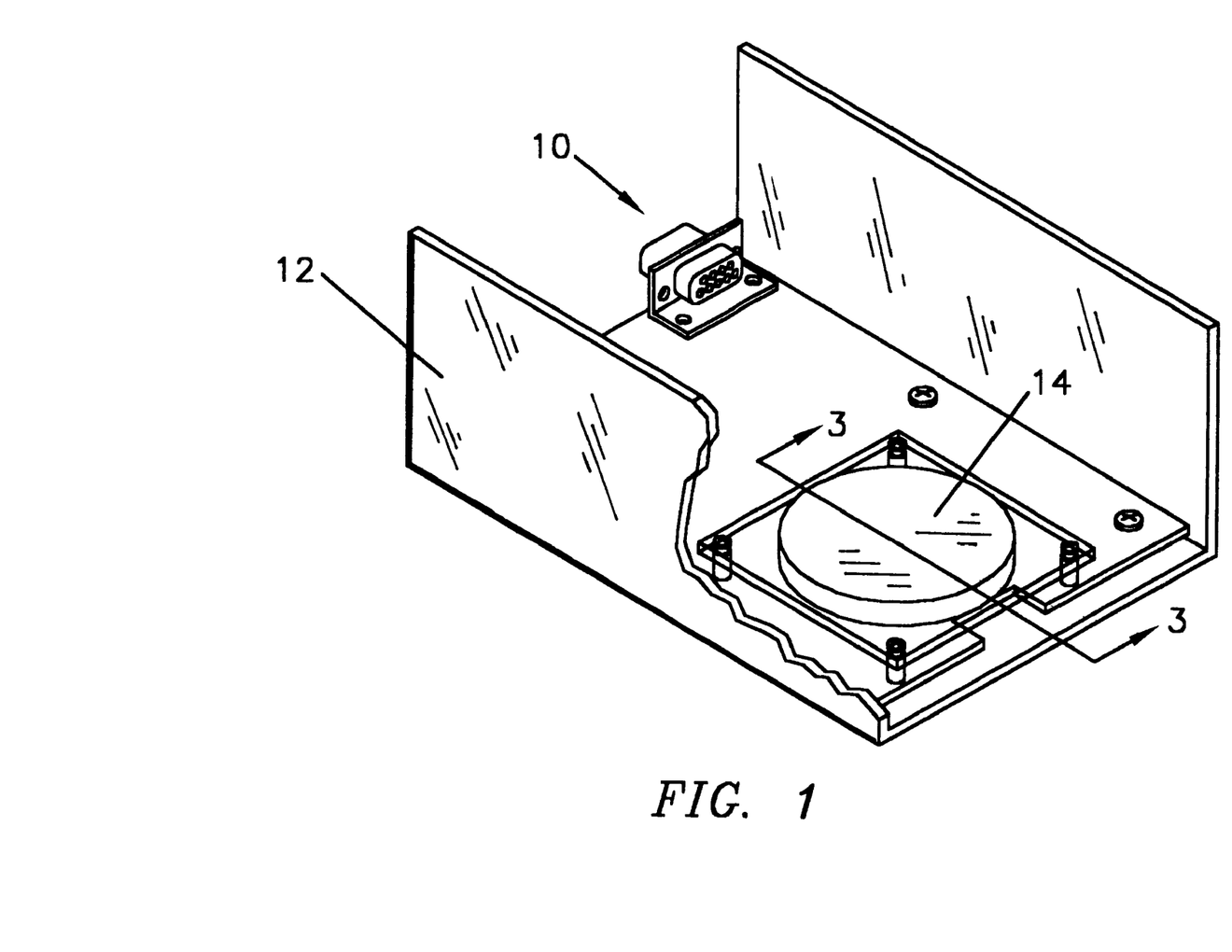
FIG. 1 is a top pictorial view of the reflective compass device of the present invention. The view illustrates a housing for enclosing a compass card assembly including a compass card. A PC board is shown mounted in the lower portion of the housing. The top of the housing has been removed for clarity.
Figure 2:
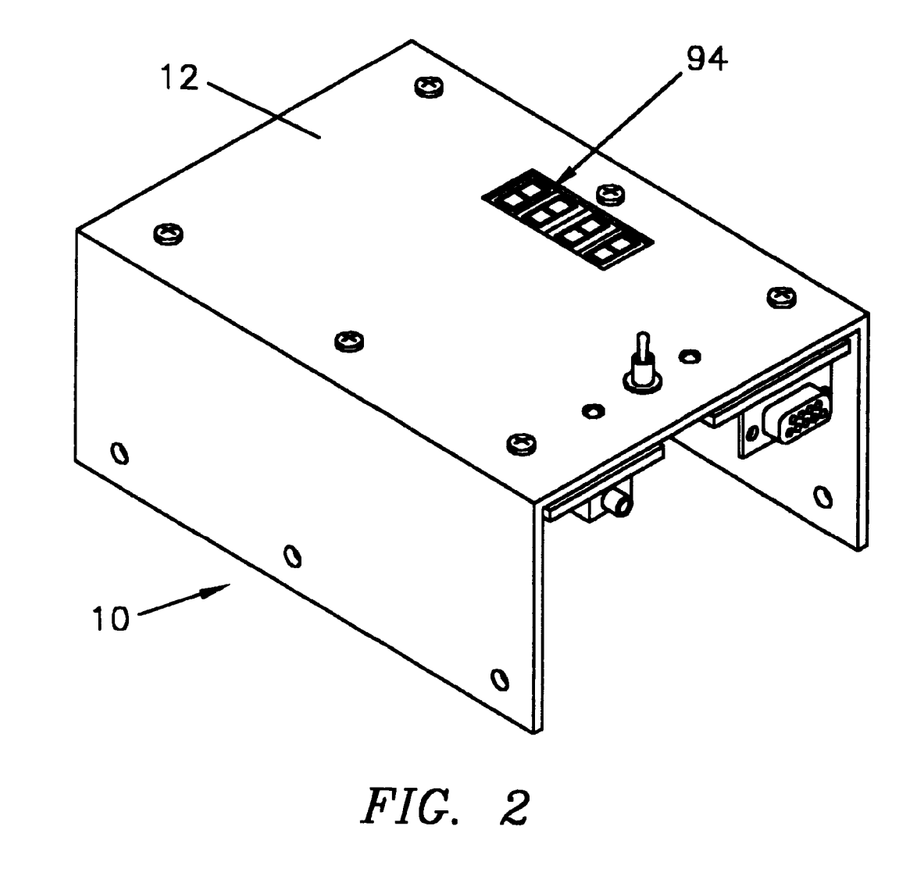
FIG. 2 is a bottom pictorial view of the housing of FIG. 1 and illustrates a digital display for displaying the positional information provided by the device.
Figure 3:
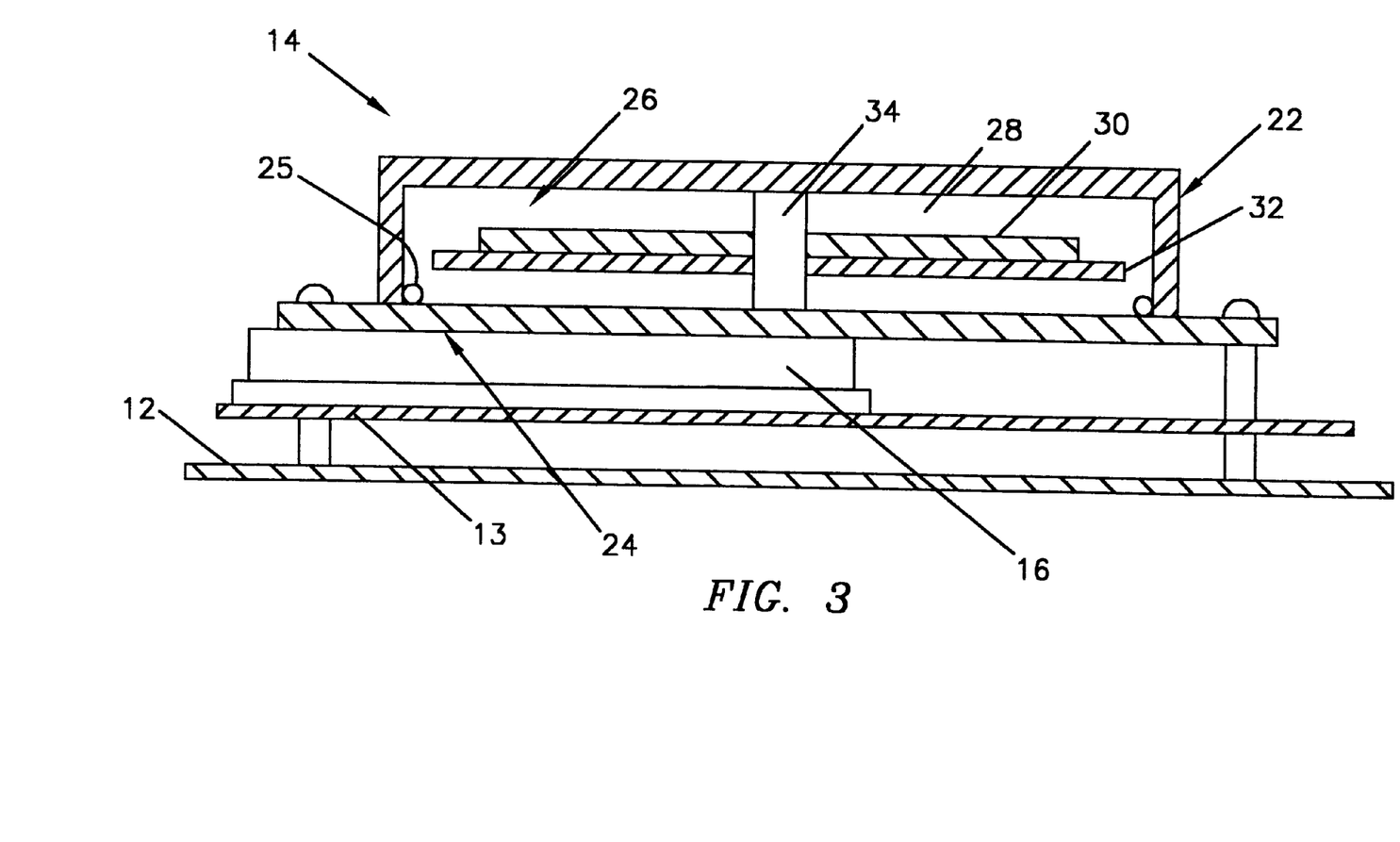
FIG. 3 is a sectional view taken along line 3—3 of FIG. 1 illustrating the compass card assembly including the compass card and magnet associated with the compass card assembly.
Figure 9:
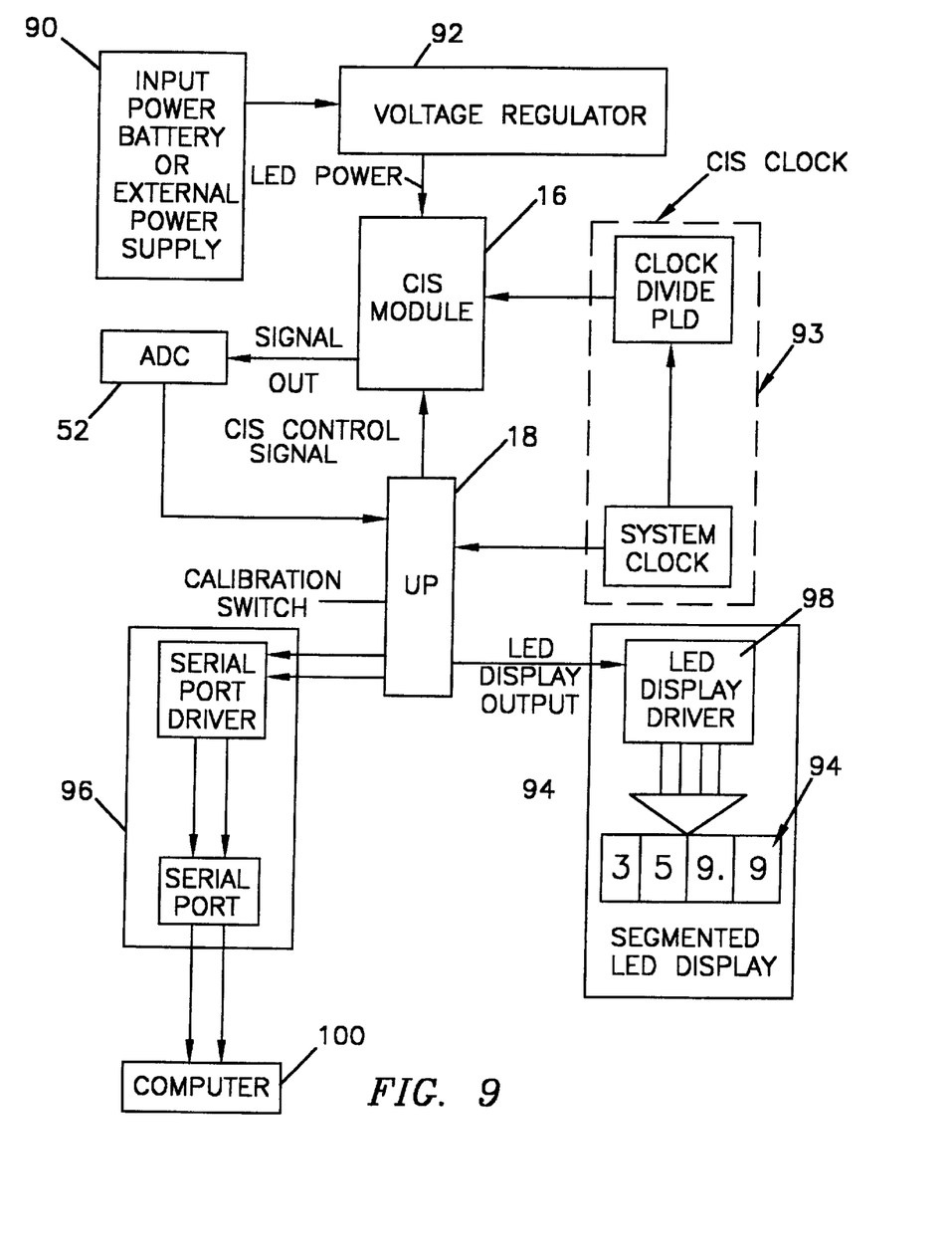
FIG. 9 is a block diagram showing the electronic circuitry including the connection of the light generating and detecting assembly, the processor, and the display.

Referring to FIG. 1, the light-reflective device 10 for determining directional information relative to an external magnetic field includes a housing 12, a reflective compass assembly 14, and a light generating and detecting assembly 16 carried on a PC board 13 beneath the assembly 14 as seen in FIG. 3. A processor 18 is mounted on the printed circuit board as shown in FIG. 9, and a display 94 is mounted on an outer bottom surface 15 of the housing 12 as shown in FIGS. 2 and 9.

Referring to FIG. 3, the reflective compass assembly 14 includes a housing 22 having a transparent base 24 using o-rings 25 to form an enclosure 26. The enclosure 26 may be filled with a liquid 28. The transparent base 24 is transparent to allow light to pass into and out of the reflective compass assembly 14. The housing 22 is made out of a non-magnetic material commonly used in compass devices. The liquid 28 may be of the type commonly found in conventional compass devices. In a preferred embodiment, the base 24 is manufactured out of Plexiglas. However, other transparent materials may be used.

A magnet 30 mounted on a compass card 32 is rotatably connected to an axle 34 within the enclosure 26. The magnet 30 includes a north pole and a south pole and is responsive to an external magnetic field. In a preferred embodiment, the magnet 30 is a balanced disk magnet having a diameter approximately equal to the diameter of the compass card 32, the compass card 32 has a diameter of two inches, and the external magnetic field is the Earth's magnetic field. A compass card and balanced disk magnet having a smaller diameter may also be used. The magnet 30 may be responsive to other magnetic fields as well.

FIG. 3 further illustrates the light generating and detecting assembly 16 as being positioned beneath base 24 and resting on PC board 13. Board 13 is mounted on the lower surface of housing 12.

Figure 4:
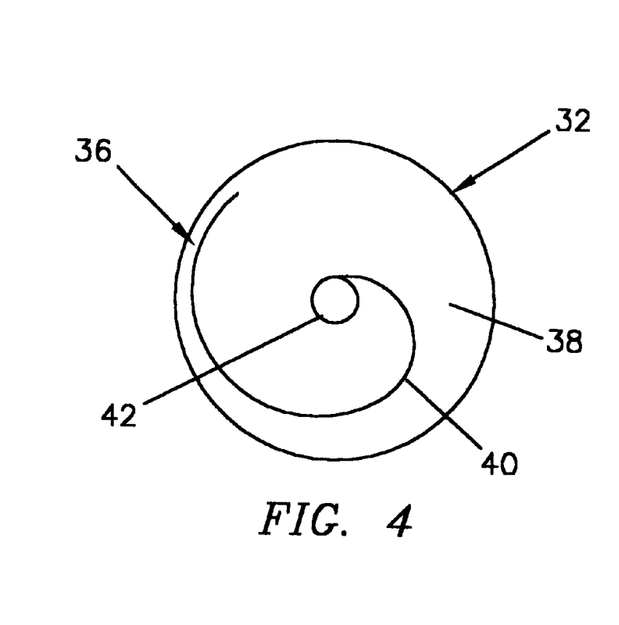
FIG. 4 is a top view of one embodiment of the compass card having a small reference circle and a spiral line pattern provided on a surface of the disk.

Referring to FIG. 4, the compass card 32 includes a reflective pattern 36. The reflective pattern 36 has a reflective portion 38, a substantially non-reflective spiral line 40, and a first substantially non-reflective circle 42. The non-reflective circle 42 has a diameter substantially smaller than the diameter of the compass card 32. In a preferred embodiment, the diameter of the non-reflective circle 42 is 0.25 inches. The non-reflective spiral line 40 includes a beginning point positioned near the center of the compass card 32 and an ending point near the edge of the compass card 32. The distance between the spiral line 40 and the first circle 42 is different for any two radial positions on the compass card 32. The non-reflective spiral line 40 and first circle 42 may not be completely non-reflective, that is, the non-reflective spiral line 40 and first circle 42 may reflect some light. The width of the spiral line 40 and the first circle 42 may vary. In a preferred embodiment, the width of the spiral line 40 and first circle 42 is 0.125 inches.

Figure 5:
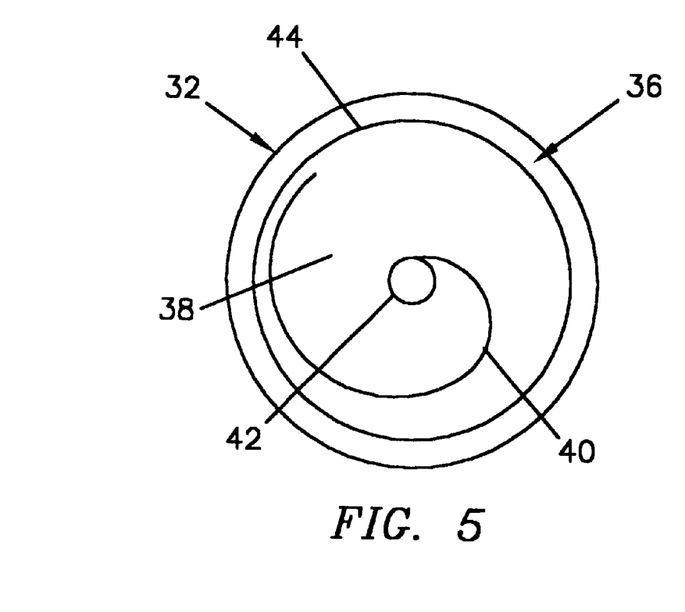
FIG. 5 is a top view of another embodiment of the compass card and is similar to the embodiment of FIG. 3 except a second larger reference circle is provided on the disk surface.

FIG. 5 is a view similar to FIG. 4 except a circle 44 is provided on the compass card adjacent the peripheral surface thereof. Such a second circle compensates for run-out. The distance between the spiral line 42 and circle 44 is different for any two radial positions on compass card 32.

Figure 6:
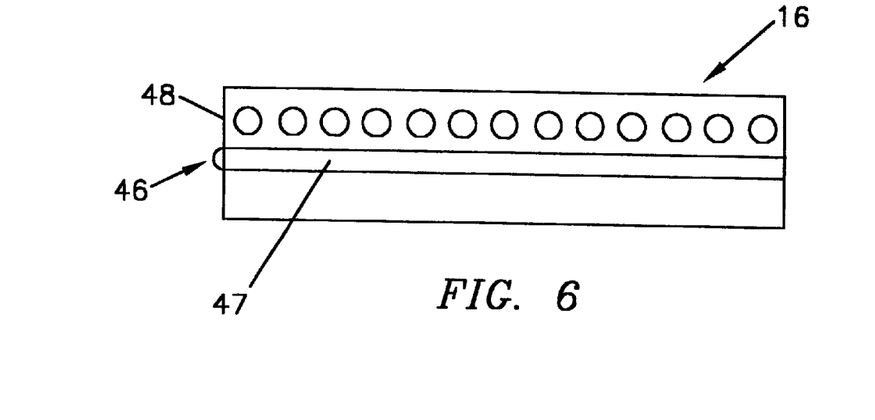
FIG. 6 is a top view of the light generating and detecting assembly.
Figure 7:
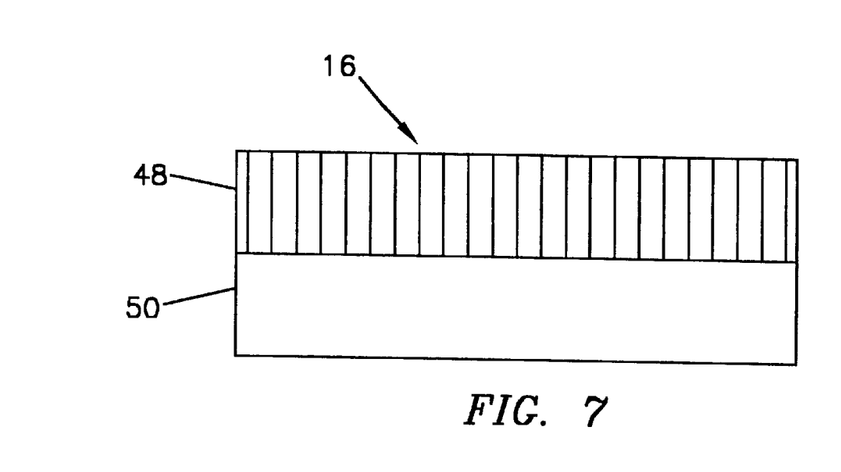
FIG. 7 is a side view of the light generating and detecting assembly.

Referring to FIGS. 6 and 7, the light generating and detecting assembly 16 includes a light source 46, a micro lens array 48, and a linear array of detectors 50. The light source 46 is operative to generate light. The lens 48 is operative to focus light. Each detector in the linear array of detectors 50 is operative to generate an analog signal proportional to the intensity of light striking each detector. If a detector is illuminated by a high-intensity light signal the detector produces a high voltage electrical signal. If the detector is illuminated by a low-intensity light signal the detector produces a low voltage electrical signal. In a preferred embodiment, the light generating and detecting assembly 16 is a contact image sensor (CIS) module. One such module is commercially available from Scan Vision, Inc. The CIS module includes an LED 46 and distributing light pipe 47 for the light source 46 and columniation optics (also known as Graded Index Micro Lens Array) for the lens 48. The CIS module has one LED as mentioned, but the light from it is spread across the CIS module via the light pipe 47 (as seen in FIG. 6) so there is a relatively uniform light across all of the individual elements of the array. A fused fiber optic face plate or conventional lens and mirror optics may be used for lens array 48 as well. The CIS module includes 300 detectors, each detector having a width of approximately 0.0033 inches, and has a resolution of 300 dots per inch (DPI). CIS modules with a larger or smaller resolution may be used as well. In addition, conventional Charge Coupled Devices (CCD), optics, and light sources may be used for the light generating and detecting assembly 16.

Figure 8:
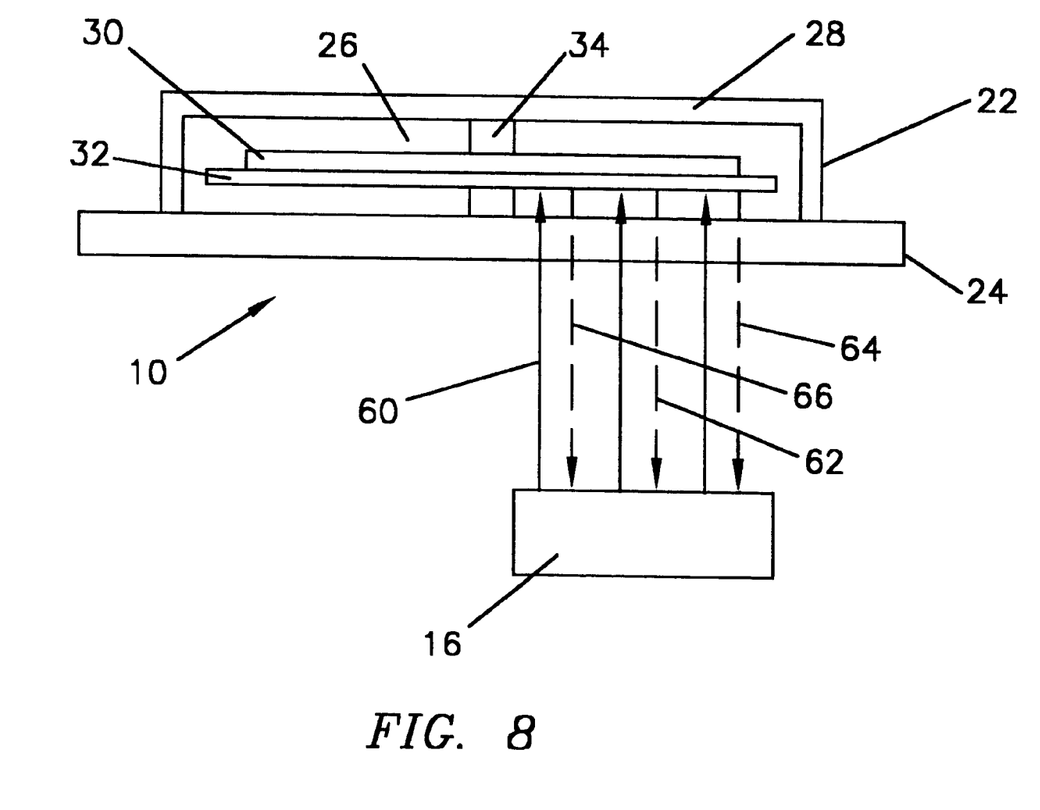
FIG. 8 is a side view of the compass card assembly of the present invention and illustrates the transmission of light from the light generating and detecting assembly to and from the reflective compass card.

Referring to FIG. 8, the device 10 operates in the following manner. The light generating and detecting assembly 16 generates and directs a light signal 60 toward the reflective compass card 32 and assembly 14. The light signal 60 passes through the transparent base 24 and strikes the reflective pattern 36 on the compass card 32. A high-intensity light signal 62 is reflected off of the reflective portion 38, a first low-intensity light signal 64 is reflected off of non-reflective spiral line 40, and a second low-intensity light signal 66 is reflected off of the non-reflective circle 42. Light signals 62, 64, and 66 exit the compass assembly 14 through the transparent base 24, pass through the lens array 48, and strike the linear array of detectors 50 (FIGS. 6 and 7).

Figure 10:
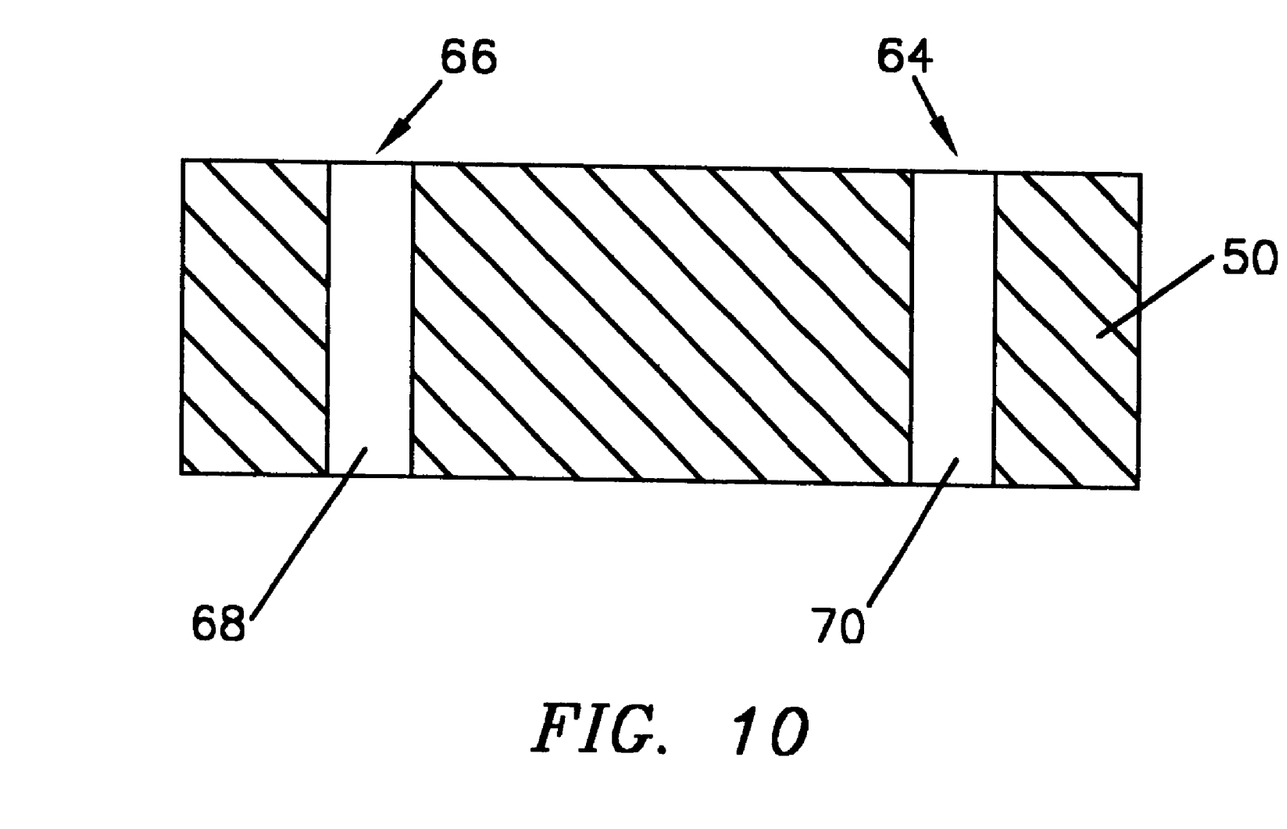
FIG. 10 is a top view of the linear array of detectors showing the positions at which the light signals strike the linear array of detectors.

Referring to FIG. 10, the second low intensity light signal 66 strikes the detectors 50 at a first position 68 and the first low intensity light signal 64 strikes the detectors 50 at a second position 70. The detectors illuminated by low intensity light signal 66 generate a low voltage electrical signal and the detectors illuminated by light signal 64 generate a low voltage electrical signal. The detectors illuminated by light signal 62 generate high voltage electrical signals.

As the compass card housing 12 rotates with respect to the external magnetic field, the position 70 moves along the detectors 50. The linear distance between position 68 and position 70 on the detectors 50 is representative of the angular position of the housing 12 with respect to the compass card 32 and, since the compass card 32 is aligned with the external magnetic field, the external magnetic field.

Referring to FIG. 9 which illustrates the electronic circuitry of the device, the processor 18 is connected to the light generating and detecting module 16 and to the display 94. The processor 18 includes software that causes the processor 18 to continuously scan the output of the light generating and detecting assembly 16. In a preferred embodiment, the processor 18 scans the module 16 every 200 milliseconds. The processor 18 further includes software that causes the processor 18 to determine the first position 68, the second position 70, and the distance between the first position 68 and second position 70 (FIG. 10). The processor 18 converts the linear distance between the first position 68 and the second position 70 to an angular position corresponding to the angular position of the housing 12 relative to the external magnetic field. The processor 18 then displays the angular position of the housing 12 with respect to the external magnetic field on the display 94. In a preferred embodiment, the display 94 includes four, eight segment LED display devices.

In a preferred embodiment, a linear distance of approximately 0.0033 inches corresponds to an angular distance of approximately 1.3 degrees. Thus, a linear distance between first position 68 and second position 70 of 0.0032 inches corresponds to the housing 12 being positioned at an angle of 2.6 degrees with respect to the external magnetic field.

However, other proportional relationships between the linear distance and the angular distance may be used as well.

The processor 18 must be calibrated with minimum and maximum distance values. In a preferred embodiment, the processor 18 is calibrated to interpret a linear distance of 0.0048 inches as an angular position of 0 degrees and a linear distance of 1 inch as an angular position of 359.9 degrees.

Figure 11:
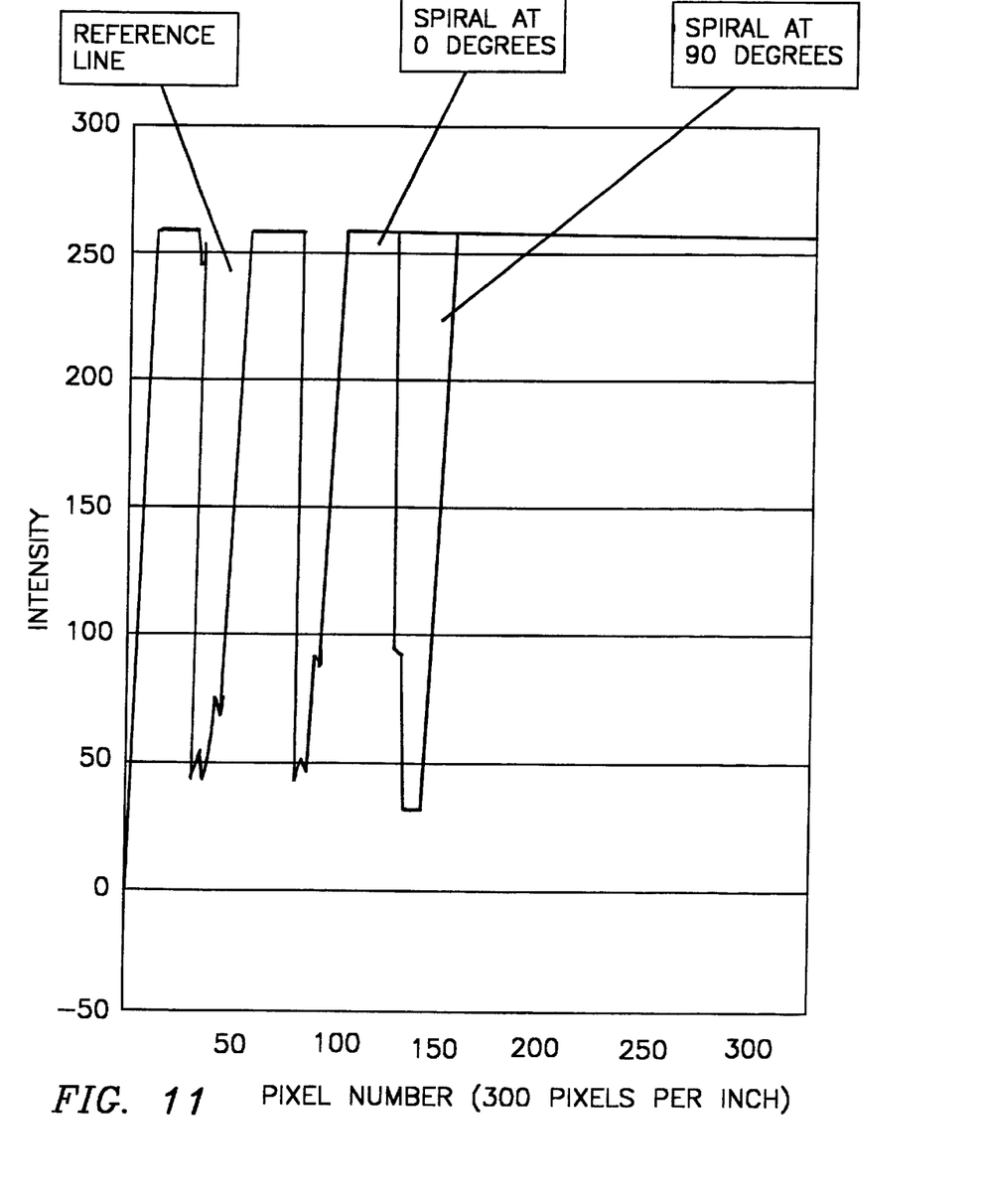
FIG. 11 is a graph illustrating a single pixel wide line profile.

FIG. 11 is a graph representing the array of pixels from two different scans and is discussed hereinbelow.

Figure 12:
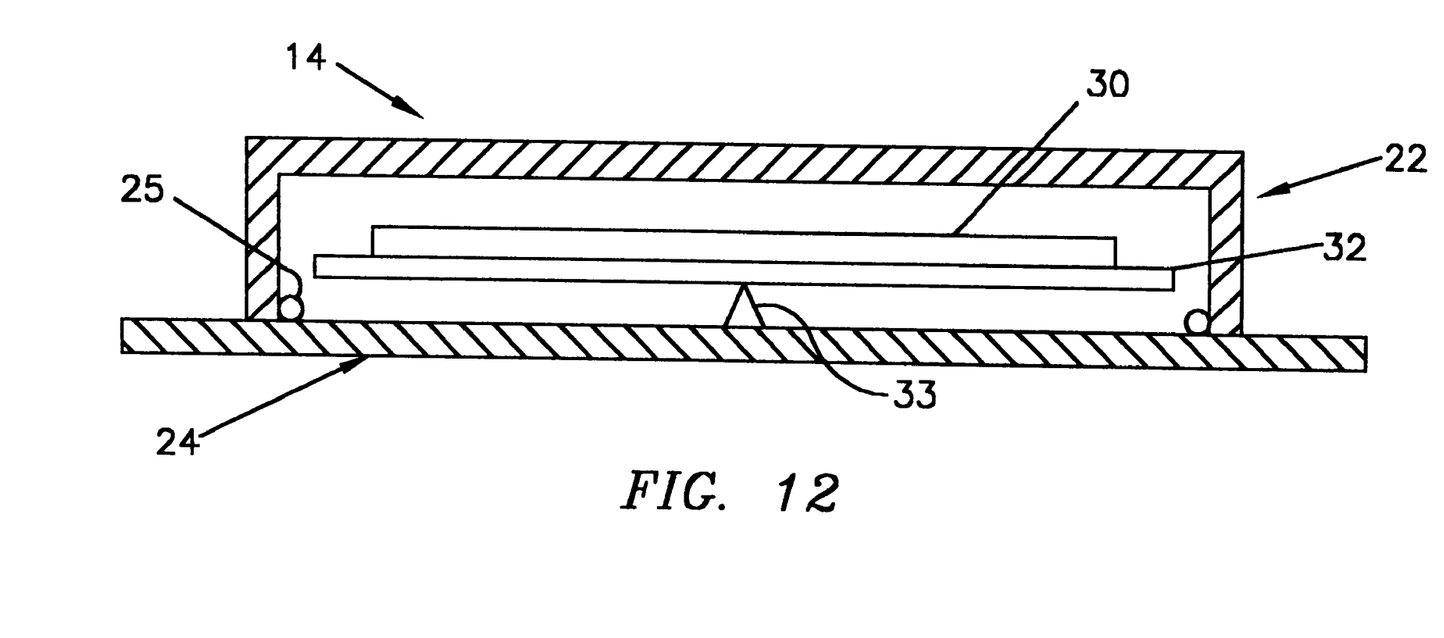
FIG. 12 is a view similar to FIG. 3 but illustrates an alternate embodiment of the compass card assembly housing.

FIG. 12 is a view similar to FIG. 3, however, in this embodiment the compass card 32 is freely rotatable but the card is allowed to tilt. This is accomplished by providing a jeweled bearing pivot float on a supporting needle 33. In this embodiment the compass card seeks its own equilibrium level independent of the compass enclosure and permits tilt of a compass card relative to the compass enclosure and optical system.

It is to be understood that tilt distorts the pixel location of the image circles and spiral line by the cosine of the tilt. For example, an image of a spiral line of 0.500 inches distance from the internal reference circle that is tilted 10 degrees would actually be measured as 0.492 inches or a difference of 0.006 inches. This would correspond to an error of 2.6 degrees (2×003 inches per 1.3 degree increments).

Since the outside reference circle is also distorted, but from a known distance, this can be used to measure the amount of error from tilt and correct the angular measurement accordingly.

Supporting Electronics

The supporting electronics control and process the information from the Contact Image Sensor, calculates the compass position heading, displays the heading, and communicates the information to an optional computer. The following refers to the functional block diagram of FIG. 9. All of the components except the CIS module are mounted, in circuit, on the PCB.

1. Input power is applied either by a battery or an external power supply 90; an external power supply converts the AC line voltage to the required DC voltage.
2. The voltage regulator 92 adjusts and regulates the input voltage supplied to the CIS module 16 and the other electronic components on the PCB.
3. The system clock 94 is a crystal oscillator used by the microprocessor and the CIS module 16. The CIS module operates at a slower clock frequency than the microprocessor and a Programmable Logic Device (PLD) is used to reduce the clock frequency for the CIS module to the appropriate frequency.
4. The CIS module 16 is connected to the PCB by an external cable and connector. The CIS module uniformly illuminates the target pattern (spiral and reference lines) via a LED and columniation optics.

The light reflected from the pattern in focused onto an array of photosensitive detectors via a linear array of gradient index micro lenses. The photosensitive detector array converts the light striking the individual detectors elements into a voltage signal proportional to the light intensity. This results in a high voltage signal for the white spaces of the target pattern and a low voltage signal for the black line (or absence of light) areas of the target pattern.

The CIS module 16 upon receiving the control signal from the microprocessor 18, the CIS sequentially transfers the voltage value for each detector element in the detector array (also known as pixels). The CIS clock 94 is used to control the sequential transfer of single detector elements voltage signal to an ADC. Each pixel has a location number representing its position in the detector array. The spacing (dot pitch) between the detector elements or pixels is very precise and can be used to measure distances along the array.

5. The ADC (Analog to Digital Converter) 52 converts the voltage signal of a detector element of the CIS into a digital format that can be read by the microprocessor. This is accomplished by linearly interpolating a voltage ranging from 0.0 V to 4.5 V into a number between 0 and 255. The higher the voltage the higher the number. White space would have high numbers and black lines would have low numbers. The number is read and stored in memory of the microprocessor. This is repeated until the value of each detector element has been transferred and stored into the microprocessor memory.
6. The microprocessor 18 controls the sequence of events, analyzes the detector data from the CIS 16, calculates the position, calibrates the position and formats the output for the display and serial output to the computer. A discussion of the rotational algorithm follows at the end of the description.

The calculated position output of the microprocessor is sent to two independent forms of display. A 4-digit LED display 94 on the functional model and a serial output 96 for alternate connection to a computer.

7. The LED display output from the microprocessor is converted by the LED Display Driver from a digital number representing the position into the signal that turns on the individual segments of four 8-segment LED display devices.
8. The serial output 96 from the microprocessor is a serial stream of data bits following the standard RS-232 communication protocol. The data is sent in two forms: 1) positional information identical to the data send to the LED display, and 2) the intensity value of each pixel in the detector array; the latter to be used for diagnostic and alignment purposes. The data stream is converted by the serial port driver from the voltage level of the microprocessor into the voltage level required for transfer to a computer.
9. A computer 98 is used to display the identical value as the LED display. This value is also converted to an analog or needle movement display similar to what is seen on a traditional compass. The value can also be converted from a Magnetic Heading into a True Heading by adding the appropriate local different between Magnetic and True bearings (declination).

The computer is also used to display the pixel value of each detector element on a graph for diagnostic and alignment purposes.

Position Algorithm

Upon receiving a complete line of values from the ADC/CIS system, the microprocessor calculates the pixel number that represents the midpoint of the width of the spiral line and the pixel number the represents the midpoint of the reference line. FIG. 11 is a graph of the array pixel values from two typical scans; the second rotated 90 degrees relative to the first. The reference and spiral lines are represented by negative peaks (going from high to low and back to high). The width is determined by counting the number of pixels that are lower than a threshold value of one half the average intensity. Half of this width and the address of the first pixel below the threshold determine the midpoint of the line.

The difference between the midpoint pixel number of the reference and spiral lines is the net length of travel of the spiral measured in of pixels. The spiral line travels a fixed amount of degrees or rotation per pixel and multiplying the net number of pixels times the degrees per pixel or resolution gives the amount of rotation.

Mag. Heading={(spiral midpoint−reference midpoint−offset)×resolution−calibration}Mod 360

The offset is a constant value in pixels to compensate for the fact that at the spiral minimum there is an additional gap or added distance between the reference and spiral line. This must be subtracted to achieve a zero value at the spiral minimum.

The calibration is a value in degrees that is subtracted from the calculated heading to some known value. This is normally done by aligning the compass to magnetic or true north and pressing the calibration button. The calibration results in the display adjusting to zero and all degrees of rotation are relative to this value. This calibration factor is permanently stored in memory for use.

The Mod 360 denotes that there is additional mathematics to adjust the calculated headings that are negative or over 360 degrees.

The resolution of the system or degrees per pixel is the most significant factor in defining the performance of the compass. For example, a functional model design has a resolution of 1.3 degrees and all other errors of precision and accuracy were smaller than this 1.3 degrees. The resolution is defined as the total change in degrees of rotation of the spiral radius in pixels or:

Resolution=360 degrees/{(spiral max radius−spiral min radius)×dot pitch in dpi

Resolution and corresponding increase in accuracy and precision can be improved by increasing the CIS dot pitch or by increasing the net spiral distance. The latter factor requires an increase in compass card diameter to accommodate a larger spiral pattern.

For the functional model with a 2" diameter compass card this value is:

360 degrees/{(0.923")×300 dpi}=1.3 degrees/pixel

For a CIS of 600 dpi the resolution would be 0.75 degrees.

Correspondingly, if there is less need or accuracy and precision, the resolution can be degraded and the diameter of the compass card can be reduced. For example, a 600 dpi system with a resolution of 2 degrees would be approximately 1" in diameter.

Thus, although there have been described particular embodiments of the present invention of a new and useful Light-Reflective Compass Device, it is not intended that such references be construed as limitations upon the scope of this invention except as set forth in the following claims.

The invention claimed is:

1. A device for determining directional information relative to an external magnetic field, comprising:
    a housing;
    a compass assembly mounted in said housing, said compass assembly having a freely rotatable compass card provided with a reflective pattern thereon for reflecting light, said reflective pattern being representative of directional information of said housing relative to the external magnetic field;
    a light generating and detecting assembly for generating light and receiving light reflected from said compass card, said detecting assembly operative to generate a signal representative of the orientation of said housing relative to the external magnetic field;
    a processor for processing said signal to determine the orientation of said housing relative to the external magnetic field; and
    circuit means including said processor and display means to display said processed signal to provide directional information.

2. The device of claim 1, wherein said reflective pattern of said disk includes a spiral line and a circle disposed thereon, said spiral line extending radially outwardly from said circle.

3. The device of claim 2, wherein said spiral line and said circle are non-reflective.

4. The device of claim 3, wherein said light generating and detecting assembly further comprises source of light and a linear array of detectors.

5. The device of claim 4, wherein said compass assembly includes a housing enclosing said compass card and a balanced disk magnet mounted to said compass card.

6. The device of claim 5, wherein said compass card and said magnet is provided with substantially identical diameters.

7. The device of claim 6, wherein said light generating and detecting assembly is defined as a contact image sensor.

8. A device for determining directional information relative to an external magnetic field, comprising:
    a housing;
    a compass card assembly mounted in said housing and enclosing a compass card for reflecting light using a reflective pattern, the reflective pattern including a non-reflective spiral line separated by a distance from a non-reflective circle, and the distance between said spiral line and said circle representative of directional information of said housing relative to the external magnetic field;
    a light generating and detecting means for generating and directing light to said compass card and for receiving light reflected from said compass card, said detecting means operative to generate a signal representative of the orientation of said housing relative to the external magnetic field, and said detecting assembly including a linear array of detectors and a lens;
    a processor for processing said signal to determine the orientation of said housing relative to the external magnetic field; and
    a display operably connected processor and disposed for displaying the orientation of said housing relative to the external magnetic field.

9. The device of claim 8, wherein said compass card housing includes an upper non-magnetic body portion having a fused fiber optic face plate secured to the base thereof.

10. The device of claim 8, wherein said compass card assembly includes a freely rotatable compass card having a magnet secured thereto.

11. The device of claim 10, wherein said magnet comprises a balanced disk magnet having a diameter substantially equal to said compass card diameter.

12. The device of claim 8, wherein the light generating and detecting means comprises a contact image sensor including a micro lens array for directing said light to detecting means.

13. A method for determining orientation of a housing enclosing a compass card relative to an external magnetic field, comprising the steps of:

(a) generating a source of light;

(b) transmitting said light from said light source to a freely rotatable compass card having a reflective pattern thereon;

(c) reflecting said light from said compass card;

(d) detecting light reflected from said freely rotatable disk with an electronic signal proportional to the intensity of the said reflected light; and (e) processing said electronic signal to determine the orientation of said housing relative to the magnetic field.

14. A compass sensor device including:

a housing;

an opaque disk having a spiral line of fixed width and contrasting material disposed on said disk;

a magnet mounted to said disk to effect rotation thereof in relation to an external magnetic field;

sensor means for imaging said spiral line, said sensor means disposed for providing an excitation light source for reflection off said disk;

detection means for detecting said light reflected off the disk and for providing an electronic signal proportional to the intensity of said reflected light;

processor means for processing said electronic signal to determine the orientation of the housing relative to an external magnetic field; and display means for receiving said processed electronic signal and to display data contained in said signal.

15. A compass sensor device as set forth in claim 14 wherein said sensor means and said detector means are integral.

16. A compass sensor device as set forth in claim 15 wherein said integral sensor means and detector means are defined as a contact imaging sensor.

* * * * *